US005730171A

United States Patent [19]

Niakan

[11] Patent Number: 5,730,171

[45] Date of Patent: Mar. 24, 1998

[54] VALVE ASSEMBLY

[75] Inventor: Shahriar Nick Niakan, Woodland Hills, Calif.

[73] Assignee: Emhart Inc., Newark, Del.

[21] Appl. No.: 786,946

[22] Filed: Jan. 23, 1997

[51] Int. Cl.[6] .......... G05D 11/03

[52] U.S. Cl. .......... 137/98; 92/99

[58] Field of Search .......... 92/99; 137/98, 137/100; 251/61.2

[56] References Cited

U.S. PATENT DOCUMENTS

| | | | |
|---|---|---|---|
| 3,048,274 | 8/1962 | Lundeen . | |
| 3,688,790 | 9/1972 | Esten . | |
| 3,724,480 | 4/1973 | Povalski et al. . | |
| 3,794,075 | 2/1974 | Stoll et al. | 137/625.66 |
| 3,921,659 | 11/1975 | Rudewick, III . | |
| 4,094,333 | 6/1978 | Petursson . | |
| 4,095,610 | 6/1978 | Priesmeyer . | |
| 5,445,181 | 8/1995 | Kuhn et al. . | |
| 5,501,244 | 3/1996 | Shahriar | 137/98 |
| 5,634,391 | 6/1997 | Eady | 92/99 X |

*Primary Examiner*—Gerald A. Michalsky
*Attorney, Agent, or Firm*—Harold Weinstein

[57] ABSTRACT

A valve assembly 30 having a pressure balancer 38 disposed in a housing 32 in which is formed a chamber 48. A one-piece poppet unit 46 is mounted for movement in the chamber 48. The poppet unit 46 has a shaft 51 with a circular disc 106 to which is bonded a diaphragm 56 and a pair of poppets 52 and 54 formed at either end thereof. The diaphragm 56 divides the chamber to form a compartment on either side thereof in which there is zero leakage across the diaphragm 56 of the poppet unit 46 and eliminating any cross-flow leakage between the hot and cold water, respectively, in the chamber compartments.

3 Claims, 6 Drawing Sheets

VALVE ASSEMBLY

BACKGROUND OF THE INVENTION

This invention relates to a valve assembly and relates, particularly, to a valve assembly having an anti-scald pressure balancer which uses a one-piece poppet unit including a diaphragm bonded to the poppet member to provide a no-leak connection therebetween so that the selected mix of hot and cold water passing through the valve assembly is maintained.

Typically, a pressure balancer includes a poppet unit having two poppets where each is formed with hard closure surfaces with one poppet located in a hot water flow path and the other poppet located in a cold water flow path. The flow paths are separated by a diaphragm to which the poppet unit is connected. The diaphragm, which separates the two flow paths, is responsive to changes in the pressure of the hot and cold water passing through the paths and moves the poppet unit and poppets accordingly. When the hot and cold water pressures are equal, the system is balanced and the diaphragm is in a neutral position. When the cold water pressure decreases or fails, the diaphragm moves toward the cold water flow path and pulls or moves closer to or into engagement with a hard fixed surface to effectively control flow of the hot water upon a decrease in the cold water pressure or to effectively seal the Jot water flow path upon failure of the cold water pressure and thereby prevent scalding of the user of the related shower. The pressure balancer operates in a similar fashion when the hot water pressure decreases or fails and thereby controls the cold water flow or shuts off the cold water accordingly.

A valve assembly having an anti-scald pressure balancer is shown and illustrated in U.S. Pat. No. 5,501,244, which issued Nov. 15, 1994. The pressure balancer therein maintained the temperature level selected by the user by suitably mixing the hot and cold water and adjusting for any pressure changes in the hot and cold water supplies. Failure of either water supply would cause the shut off of the valve assembly. However, there exists the slight possibility of a chance of cross flow leakage because of the mechanical connection between the poppet unit and the diaphragm.

In the past, pressure balancers, for example as shown in U.S. Pat. No. 5,501,244, of the valve assembly used poppet assemblies having components mechanically connected or compressed together. These poppet assemblies resulted in a certain amount of cross-flow between the hot and cold water and the resultant inaccuracy of the temperature of the water being discharged from the valve assembly.

SUMMARY OF THE INVENTION

It is an object of the present invention to provide a pressure balancer of a valve assembly which is simple in construction, economical to produce and highly accurate in operation.

It is another object of the present invention to provide a pressure balancer of a valve assembly that responds to pressure changes in the hot and cold water supplies to continuously and accurately control the flow therethrough at the preset temperature and to stop the flow if there is a failure of either the hot or cold water supplies.

It is another object of the present invention to provide a pressure balancer having a one-piece poppet unit that in assembled position provides for zero leak thereacross.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
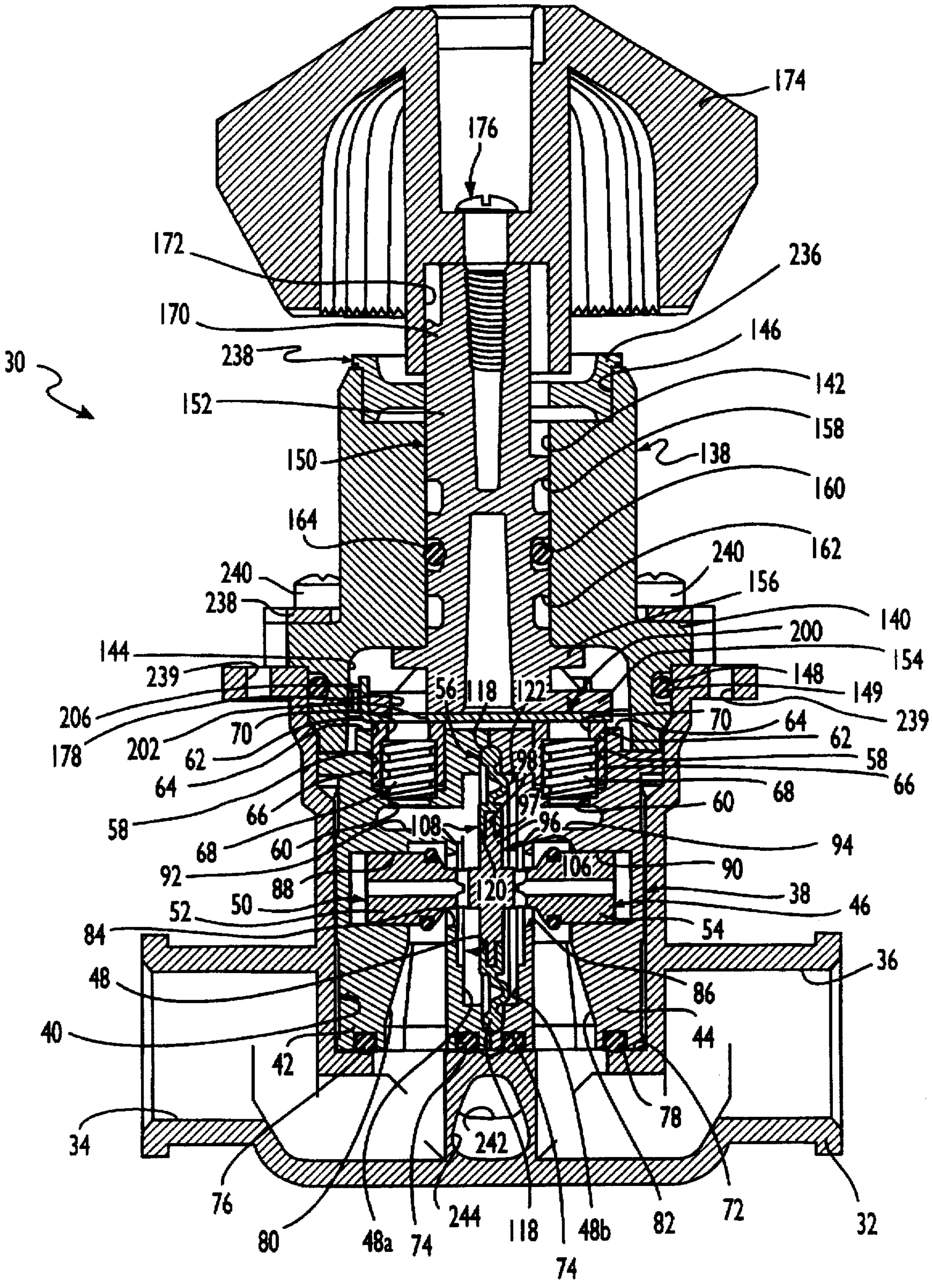
FIG. 1 is a sectional view of a valve assembly showing a pressure balancer and a mixing valve which includes a one-piece poppet to which a diaphragm is bonded to form the poppet assembly of the present invention.

Referring to FIG. 1, a valve assembly 30 includes a valve housing 32 composed of brass. Housing 32 is formed with a hot water inlet 34 and a cold water inlet 36. Hot water is supplied to valve assembly 30 through inlet 34 from a pressurized system (not shown) which is independent of a pressurized system (not shown) from which the cold water is supplied to the valve assembly through inlet 34. In another pressurized water supply system (not shown), both the hot and cold water are supplied through the same pressurized system without departing from the spirit and scope of the invention.

Figure 2:
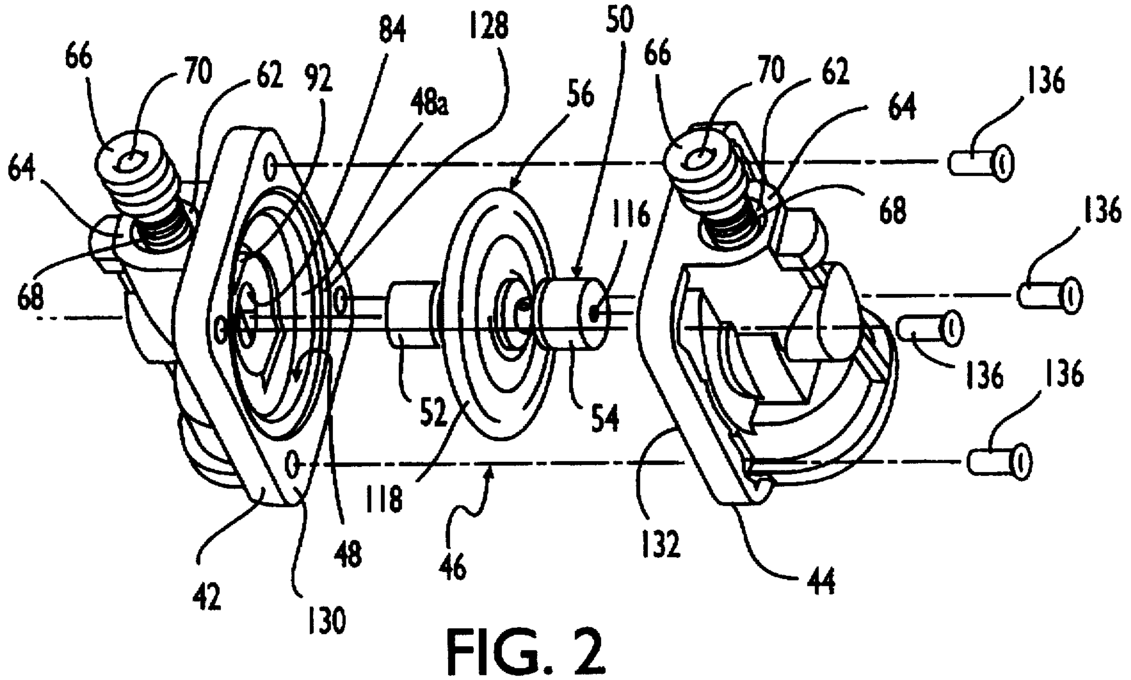
FIG. 2 is a perspective view of the pressure balancer utilizing the novel poppet assembly of the present invention.

A pressure balancer 38 is located within a chamber 40 formed in housing 32 and is formed by a pair of identically shaped plastic sections 42 and 44 which are illustrated in FIGS. 1 and 2.

A one-piece poppet unit 46 is located within a chamber 48 of pressure balancer 38 formed by the assembly of sections 42 and 44. The one-piece poppet unit 46 may be made of any suitable material such as a solid brass member or plastic member 50 and has a shaft 51 from which is formed with a pair of poppets 52 and 54 at opposite axial ends thereof. The one-piece poppet unit 46 shown in FIG. 3 also includes a flexible diaphragm 56 formed by insert molding to be bonded thereto to form a unit therewith. Diaphragm 56 may be composed of a material such as, for example, rubber and is located centrally, and laterally of the axis, on the poppet unit.

Figure 3:
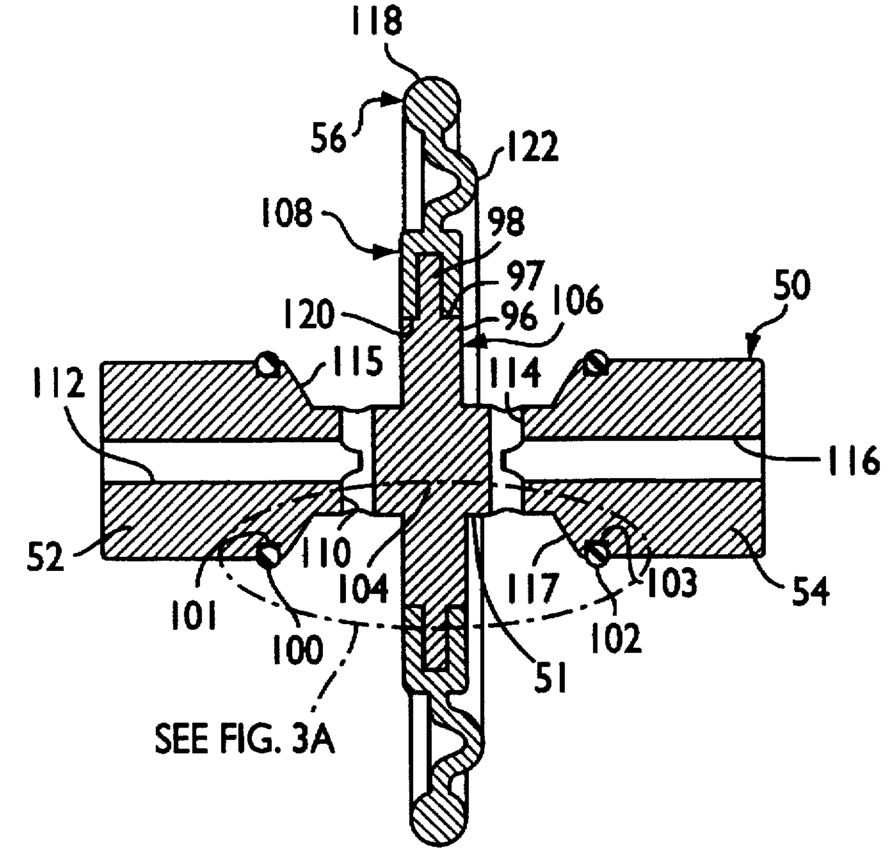
FIG. 3 is a sectional view of the novel poppet assembly shown in FIG. 1.

As viewed in FIG. 3, poppet unit 46 includes the single piece poppet member 50, diaphragm 56, an O-ring 100 mounted in a groove 101 formed on poppet 52 and an O-ring 102 mounted in a groove 103 formed on poppet 54. If desired, as shown in FIG. *3a*, during the molding of the diaphragm 56, a pair of sealing members 100*a* and 102*a* can be formed to be used in place of O-rings 100 and 102 wherein they will serve to the same purpose as that of the O-rings. As shown in FIGS. 3, poppet member 50 further includes a central portion or hub 104 with poppets 52 and 54 extending axially in opposite directions therefrom. A disc 106 is formed to extend radially upwardly from central portion 104. Disc 106 is substantially circular and hats a first section 96 and a second section 98. The first section 96 extends radially upwardly from the central portion 104 to terminate in a ledge 97 from the center of which the second section 98 extends radially a short distance. The width of the first section 96 is about three times as wide as the second section 98. A passage 110 is formed transaxially through central portion 104 adjacent poppet 52 and communicates with a passage 112 formed axially in poppet 52. A passage 114 is formed transaxially through central portion 104 adjacent poppet 54 and communicates with a passage 116 formed axially in poppet 54. A beveled surface 115 is formed at the inboard end of poppet 52 at the transition with central portion 104. Another beveled surface 117 is formed at the inboard end of poppet 54 at the transition with the hub 104. The external diameter of shaft 51 at the central portion 104 is less than the external diameter of poppets 52 and 54. Beveled transition surface 115 extends between the smaller-diameter shaft 51 and the larger-diameter poppet 52 at one end of the hub while beveled transition surface 117 extends between the opposite end of the smaller-diameter shaft 51 and the larger diameter poppet 54.

Figure 3A:
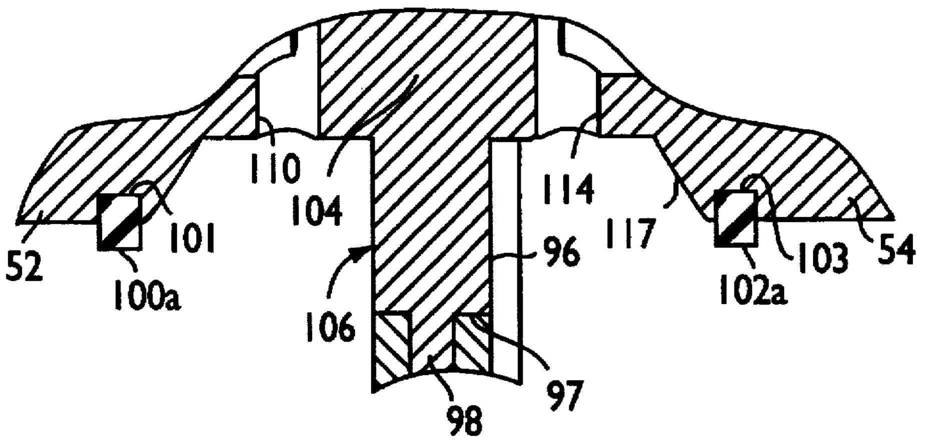
FIG. 3A is a partial sectional view showing a pair of molded sealing members in place of the O-rings depicted in FIG. 3.

Diaphragm 56, shown in FIG. 3, was formed by insert molding wherein the member 50 was placed in a mold and the diaphragm material was injected in the mold to form the diaphragm 56 which has been bonded to the member 50 as described more fully hereinafter to form the one piece poppet unit 46. Also, if sealing rings 100*a* and 102*a* (see FIG. 3*a*) are to be used, they could be formed during the molding process along with the diaphragm 56. Diaphragm 56 has an annular circular rim 118, an axial opening 120 which nests upon ledge 97, and an arcuate annular rib 122 which is concentric with and intermediate of the rim 118 and the opening 120. Radially below the rib 122, the diaphragm has a "U" shaped section 108 formed with circular legs 109 that extend downwardly on either side of the thinner second section 98 of disc 106 to be bonded thereto. The bottom of the "U" shaped section 108 nests upon the ledge 97 and has a width which places its outer surface in substantially the same plane as the outer surfaces of the first section 96 of disc 106. After the one-piece poppet unit 46 is formed, the O-rings 100 and 102 will be mounted in grooves 101 and 103, respectively, to complete the assembly thereof.

Each of sections 42 and 44 is formed with a seal well 58 which communicates with chamber 48 through a port 60 and which, as shown in FIGS. 1 and 2, extends through an outer port 62 formed in an upper surface 64 of each section. As shown in FIGS. 1, a cup-like rubber seal 66 is located in each of the wells 58 and is formed with an opening 67. Seal 66 is normally urged outwardly through port 62 by a spring 68 which is located in opening 67. Each of the seals 66 is formed with a port 70 through a base of the seal and a pair of spaced annular ribs 69 on the periphery of the seal.

Referring to FIG. 1, pressure balancer 38 is nested within chamber 40 of housing 32 and rests on a ledge 72 formed in the base of the chamber. Each of the sections 42 and 44 of pressure balancer 38 is formed with a groove 74 which receives and supports a pair of O-rings 76 and 78, respectively, to seal the water passages adjacent thereto.

Referring further to FIG. 1, sections 42 and 44 of pressure balancer 38 are formed with a water inlet passages 80 and 82, respectively, which communicate with a pair of restrictor openings 84 (FIG. 2) and 86, respectively. Passages 80 and 82 also communicate with a pair of cylindrical wells 88 and 90, respectively, which are also formed in sections 42 and 44, respectively, and which are located to receive rearward portions of poppets 52 and 54, respectively. Restrictor openings 84 and 86 communicate with chamber passages 48*a* (FIG. 2) and 48*b*, respectively, which are formed by the division of chamber 48 due to the presence of diaphragm 56. Chamber passages 48*a* and 48*b* communicate with passages 92 (FIG. 2) and 94 formed in sections 42 and 44, respectively, which, in turn, communicate with ports 60 and seal ports 70.

Figure 4:
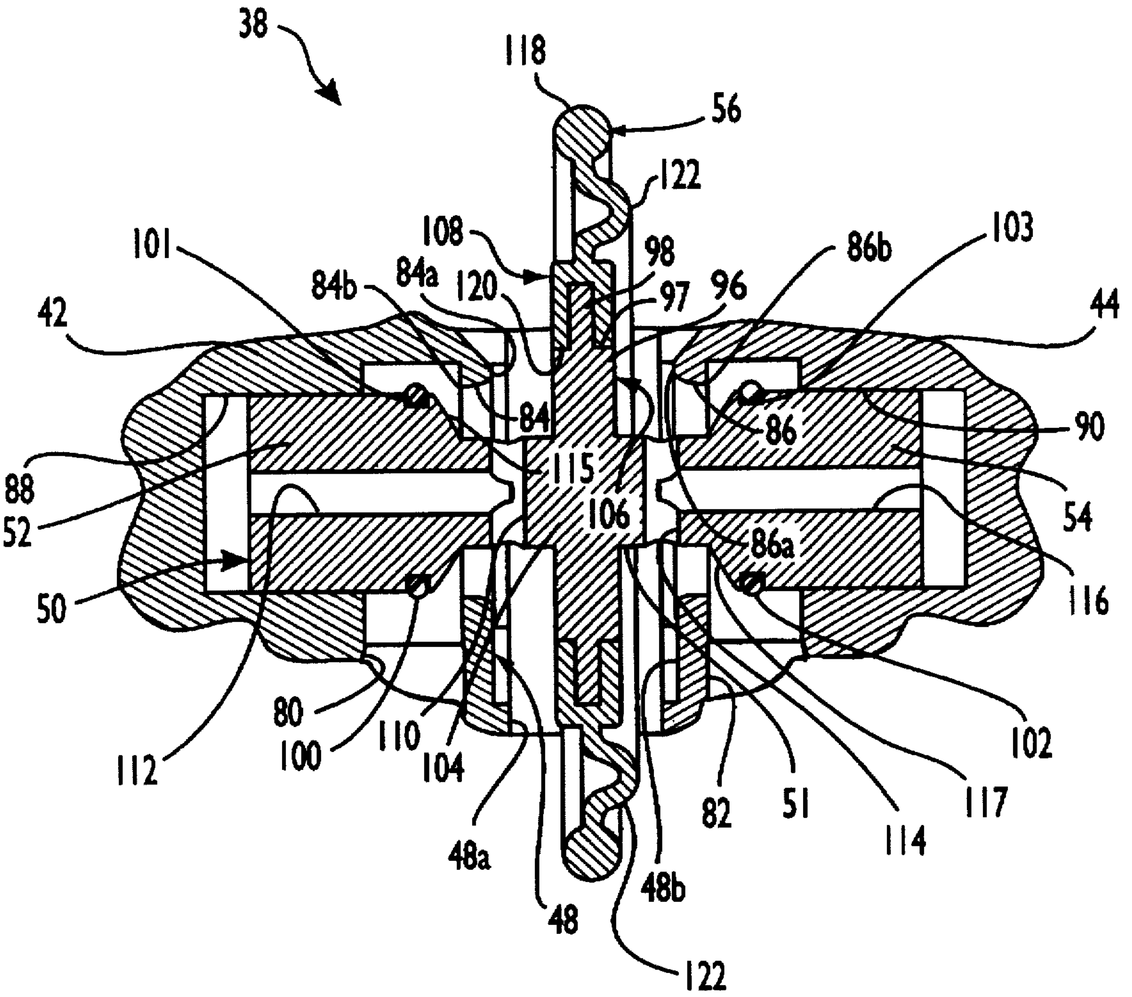
FIG. 4 is a partial view of the pressure balancer of FIG. 1 showing the pressure balancer in a neutral mode.
Figure 5:
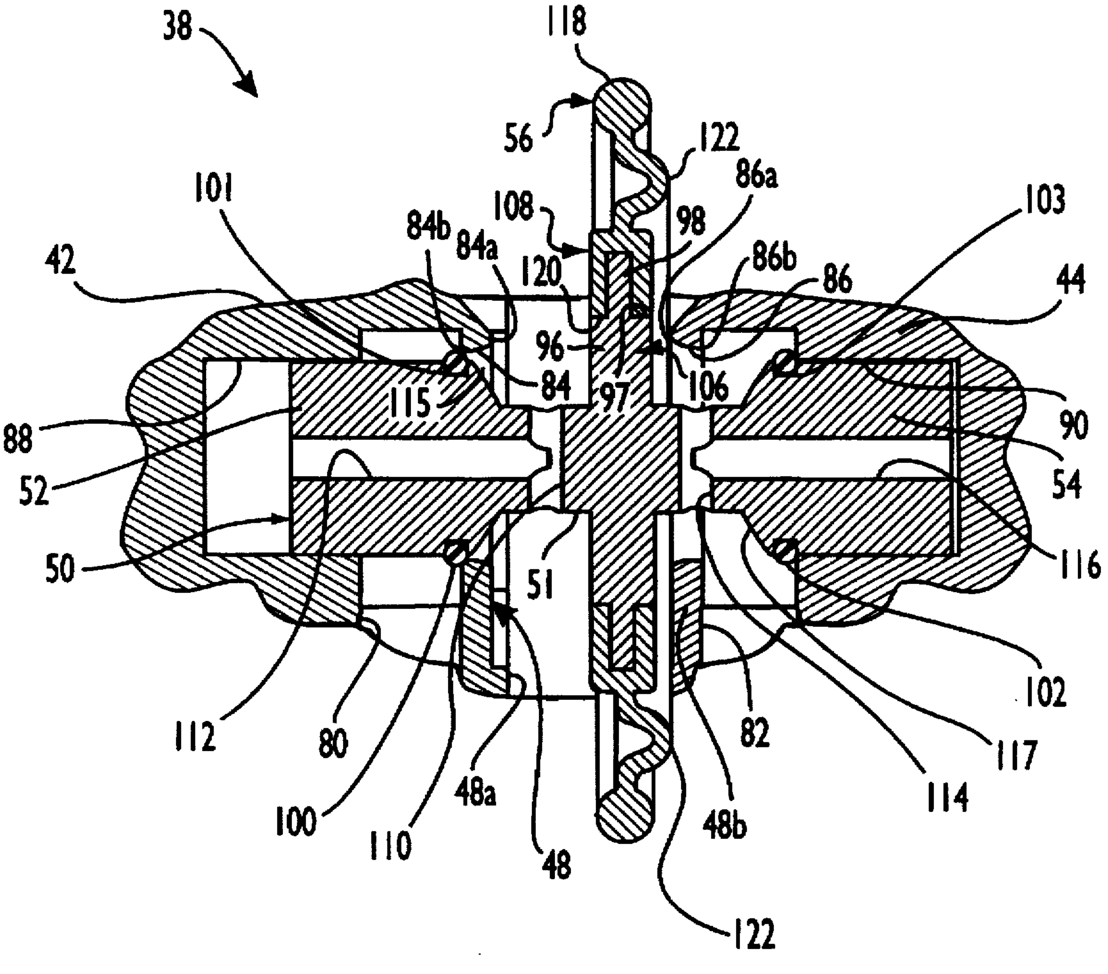
FIG. 5 is a partial view of the pressure balancer of FIG. 1 showing the pressure balancer in a cold-water-failure mode.
Figure 6:
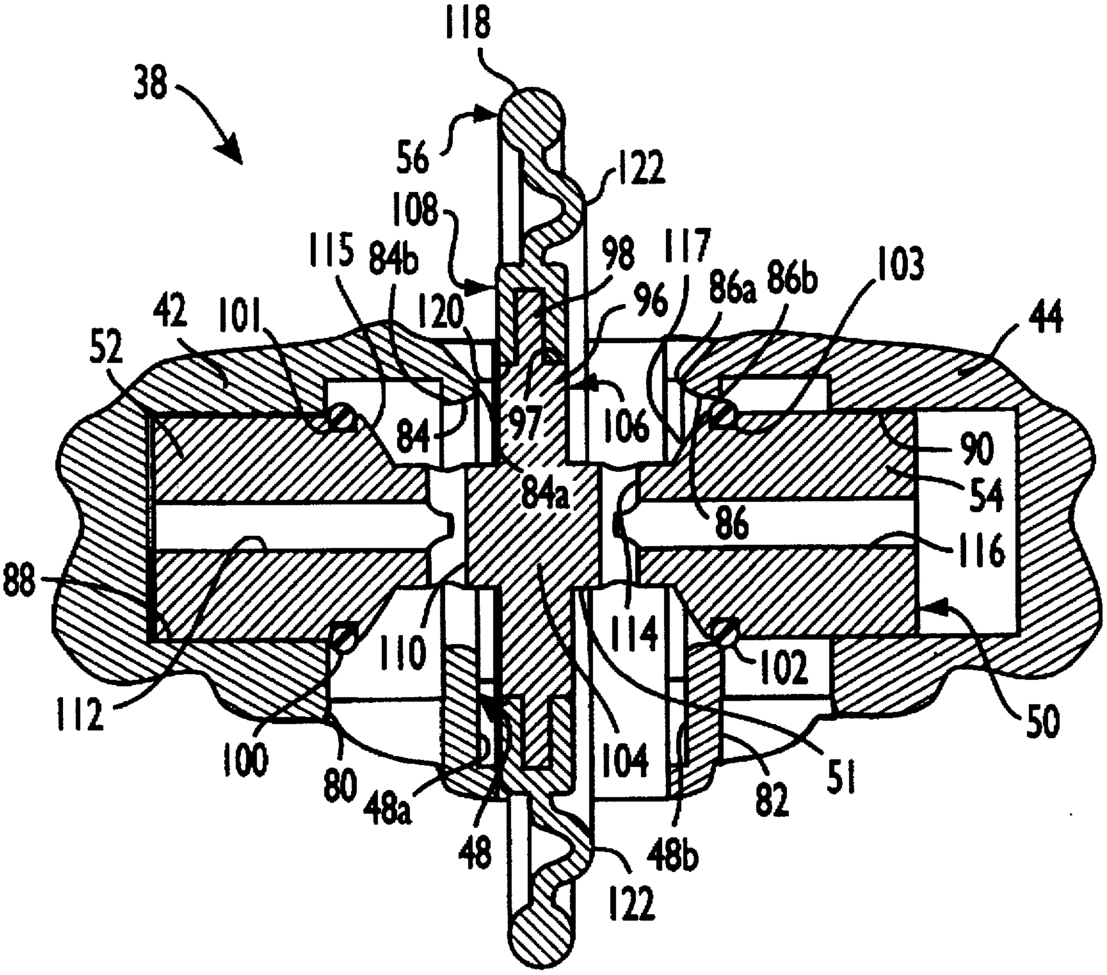
FIG. 6 is a partial view of the pressure balancer of FIG. 1 showing the pressure balancer in a hot-water-failure mode.

As viewed in FIGS. 4, 5 and 6, restrictor opening 84 is formed with a rounded corner 84*a* at the side of the opening closest to diaphragm 56 and a sharp corner 84*b* at the side of the opening closest to cylindrical well 88. Restrictor opening 86 is also formed with a rounded corner 86*a* and a sharp corner 86*b* in like manner. Further, restrictor openings 84 and 86, and cylindrical wells 88 and 90, are each formed with a diameter which is slightly larger than the diameter of poppets 52 and 54 sufficient to allow the poppets to be moved through the restrictor openings and into the wells. The closeness of the size of the diameters allows movement of the poppets 52 and 54 while essentially precluding the flow of water between the poppets and openings 84 and 86, respectively, and wells 88 and 90, respectively.

In assembling the components of pressure balancer 38, the poppet unit 46 is positioned so that poppet 52 is aligned with restrictor opening 84 of balancer section 42 which has not yet been assembled with section 44. Poppet 52 is then moved through opening 84 and into well 88. As poppet 52 is moved through opening 84, O-ring 100, which extends radially beyond the diameter of the opening, initially engages rounded corner 84a of the opening to gradually compress the O-ring and thereby allow the poppet and O-ring to pass through the opening. After poppet 52 and O-ring 100 have been moved beyond opening 84, when the poppet is moved in the reverse direction during operation of pressure balancer 38, beveled surface 115 and the full-diameter portion of the poppet on the diaphragm side of the O-ring move into the opening. However, even though rounded corner 84*a* facilitated movement of O-ring 100 through opening 84, sharp corner 84*b* precludes movement of the O-ring through the opening and the O-ring compresses to effectively seal the opening.

As poppet 52 is moved into cylindrical well 88, rim 118 of diaphragm 56 is moved into sealing engagement with a rounded radially-outboard corner 128 (FIGS. 1 and 2) of chamber 48. Restrictor opening 86 of section 44 is aligned with poppet 54 and then moved over the poppet. Rounded corner 86*a* of opening 86 allows O-ring 102 to compress gradually and pass through opening 86. As with O-ring 100, once O-ring 102 is disposed with the opening 82, the sharp corner 86*b* will, on contact with O-ring 102, seal the opening 82 and prevent O-ring 102's further leftward movement (see FIG. 6). Thus, poppet 54 is located in cylindrical well 90 and a face 130 (FIG. 2) of section 42 engages a face 132 (FIG. 2) of section 44. As faces 130 and 132 are moved into interfacing engagement, a rounded radially outboard corner 134 of chamber 48 of section 44 moves into sealing engagement with rim 118 of diaphragm 56. Rim 118 is thereby compressed between rounded corners 128 and 134 to seal and segregate chamber sections 48*a* and 48*b* from each other and preclude the flow of water from one chamber section to the other. Four rivets 136 (FIG. 2) are then moved through aligned holes (not shown) in sections 42 and 44 and are headed to retain the sections together. Springs 68 are assembled into openings 67 of seals 66 and the springs and seals are inserted into seal wells 58 with seal ports 70 extending outwardly from the wells as shown in FIG. 1 to thereby complete the assembly of pressure balancer 38.

The flow path through pressure balancer 38 for hot water entering housing inlet 34 includes passage 80, restrictor opening 84, passage 48*a*, passage 92, port 60, seal opening 67 and seal port 70. The flow path through pressure balancer 38 for cold water entering housing inlet 36 includes passage 82, restrictor opening 86, passage 48*b*, passage 94, port 60, seal opening 67 and seal port 70.

Referring again to FIG. 1, a plastic bonnet 138 is formed with a flange 140, an axial opening 142 and a chamber 144 at one end which communicates with the opening. A recess 146 is formed at the other end of bonnet 138. Further, bonnet 138 is formed with an annular groove 148 on the outer periphery thereof adjacent flange 140 for eventual receipt of a water sealing O-ring 149.

Referring to FIG. 1, a plastic water-mixing control element 150 is formed with a stem 152 and a disc-like base 154. Element 150 is also formed with a flange 156 slightly spaced inboard from base 154. Three spaced annular grooves 158, 160 and 162 are formed in the periphery of stem 152. The axially outboard grooves 158 and 162 are formed to facilitate enhancement of the formational integrity of stem 152 during curing of the plastic in the manufacture of element 150. Intermediate groove 160 is formed for eventual receipt of an O-ring 164 (FIG. 1).

Key 170 (FIG. 1) is formed in an axial direction on stem 152 and projects radially therefrom. As viewed in FIG. 1. key 170 fits into a keyway 172 formed in a control knob 174 which is positioned on the top of stem 152 and which is secured there by a screw 176.

As shown in FIG. 1, a disc 236 of an adjustable temperature limit stop facility 237 is located in recess 146 of bonnet 138. Facility 237 allows for the adjustable positioning of a stop (not shown) which establishes the limit of travel of stem 170 and knob 174 in the hot water direction.

Bonnet 138, with mixing element 150 assembled therewith, is positioned within the top opening of housing 32 and rests on the top of pressure balancer 38 and a ledge of the housing as illustrated in FIG. 1. Thereafter, a ring plate 238 is positioned over the upper portion of bonnet 138 and is positioned on top of bonnet flange 140 in such a fashion that holes (not shown) formed in the plate are aligned with holes (not shown) formed in the bonnet and threaded holes 239 formed in housing 32. Screws 240 are then inserted into the aligned holes and are threadedly secured to the threaded holes in housing 32 to capture pressure balancer 38 within the housing and to secure bonnet 138 with the housing. At the same time, mixing element 150 is captured in its assembly with bonnet 138. Also, O-ring 149 seals the top opening of housing 32 as illustrated in FIG. 1.

As bonnet 138 is assembled on top of pressure balancer 38, the underside of throttle plate 200 engages the upwardly extending upper surfaces of seals 66 which are biased firmly against the throttle plate by springs 68. With this assembly, the hot water flow path for water flowing from the hot water seal port 70, includes the tear shaped holes 202 and 178 of throttle plate 200 and base 154, respectively, and mixing chamber 144. In similar fashion, the cold water flow path for water flowing from the cold water seal port 70 has similarly shaped tear shaped holed (not shown) for the throttle plate 200 and base 154, respectively, and mixing chamber 144.

The user of valve assembly 30 can adjust the mixture of hot and cold water in mixing chamber 144 by turning knob 174 which, in turn, rotates throttle plate 200 with respect to stationary seals 66. This rotation moves various portions of the tear shaped holes over ports 70 of the respective seals 66 to adjust the volume of hot and cold water which is allowed to flow into mixing chamber 144 and thereby establish a water temperature suitable for the user. When the user wishes to stop the water flow, knob 174 is rotated to move solid portions of throttle plate 200 over ports 70 of seals 66 to seal the ports and close the flow paths for the hot and cold water.

The mixed hot and cold water, which is mixed in chamber 144, will the flow through passages (not shown) formed between housing 32 and pressure balancer 38 and will exit the housing either through a shower head outlet 242 or a spout outlet 244 as selected by the user.

Under conditions where the hot and cold water pressures from the respective hot and cold water supplies are equal, the elements of pressure balancer 38 will assume a neutral position as shown in FIG. 4 wherein the pressure on the hot water sidle of diaphragm 56 is equal to the pressure on the cold water side of the diaphragm. With diaphragm 56 being in the neutral position, poppets 52 and 54 are equally spaced from the respective restrictor openings 84 and 86 whereby the flow paths for the hot and cold water through pressure balancer 38 are equally sized.

If, for example, there is a decrease in the pressure of the cold water supply, the cold water pressure acting on the respective of side of diaphragm 56 will decrease thereby creating a pressure imbalance on opposite sides of the diaphragm. Since the cold water pressure has decreased, the greater hot water pressure will exert a force on the respective side of diaphragm 56 whereby the diaphragm moves to the right of the position shown in FIG. 4. As diaphragm 56 moves to the right, or toward the cold water side thereof, poppet 52 is moved to the right whereby beveled transition surface 115 and O-ring 100 move closer to restrictor opening 84 to restrict further the opening. At the same time, poppet 54 moves to the right of the position illustrated in FIG. 4 to open restrictor opening 86 further. As a result of this responsive action by pressure balancer 38, the volume of hot and cold water flowing into mixing chamber 144 (FIG. 1) is essentially the same as it was before the decrease in the cold water being sensed by the user remains essentially the same and the user does not experience any unpleasant, and potentially injurious, consequences even though there has been a decrease in cold water pressure.

A decrease in the pressure of the hot water will cause a comparable reaction by pressure balancer 38 where diaphragm 56 and poppets 52 and 54 move to the left from the position illustrated in FIG. 4. This provided a comparable response and maintains the mixed water at essentially the same temperature as it was before the decrease in the hot water pressure.

If the cold water pressure fails completely, there is essentially no cold water being supplied to mixing chamber 144 (FIG. 1). If hot water continues to be supplied to the mixing chamber 144, and thereby to the user, the user could be scalded. However, upon failure of the cold water pressure, diaphragm 56 moves to the right to the position illustrated in FIG. 5 where O-ring 100 engages and is compressed against sharp corner 84*b* of restrictive opening 84 to effectively close or seal the opening. This action shuts off the supply of hot water to mixing chamber 144 and to outlet 242 or 244 (FIG. 1) being used by the user thereby preventing the possible scalding of the user.

In similar fashion, when the hot water pressure fails, diaphragm 56 responds to the pressure differential and shifts poppet unit 46 to the left as viewed in FIG. 6. O-ring 102 effectively closes and seals restrictor opening 86 to preclude continued supply of cold water upon failure of the supply of hot water whereby the user is spared from the sudden shock of being subjected to the cold water only.

It is noted that, when O-ring 100 of poppet 52 moves to the position as shown in FIG. 5 to close restrictor opening 84, the O-ring prevents further movement of the poppet unit 46 to the right. Dimensionally, groove 103 of poppet 54 is located to preclude the engagement of O-ring 102 with the adjacent wall of section 44 at the entry port of well 90. This dimensioning allows O-ring 100 to fully perform the closure of restrictor opening 84 and to stop movement of poppet unit 50 without concern for O-ring 102 first engaging the adjacent wall of section 44 and preventing the full and effective performance of O-ring 100. Further; the axial length of poppet 54 is selected to insure that the poppet will not engage the end wall of well 90 at any time during the operation and use of pressure balancer 38. This also insures that O-ring 100 engages sharp corner 84*b* to close restrictor opening when called upon to do so. Further, if any pulsations occur in the movement of poppet unit 50 during the process and continuance, of closure of restrictor opening 84, the end surface of poppet 54 is precluded from engaging the end wall of well 90. This precludes any chattering noise which otherwise may have occurred had poppet 54 been as long as, or longer than, the axial depth of the well 90.

In similar fashion, poppet 52 is dimensioned so that O-ring 100 never engages section 42 and the poppet never engages the end wall of well 88 for the same reasons expressed above with respect to poppet 54 and O-ring 102.

O-ring 100 is assembled in groove 101 of poppet 52 to effectively and firmly compress against sharp corner 84*b* of restrictor opening 84 to close the opening. If pulsations occur, O-ring 100 may relax to some extent during such pulsations but does not relax sufficiently to allow the O-ring to disengage from sharp corner 84*b* whereby the O-ring is sustained in a compressed state sufficient to maintain closure of restrictor opening 84. Further, due to the soft surface of O-ring 100 in engagement with the hard surface of sharp corner 84*b* of opening 84 during closure of restrictor opening 84, there is no noticeable chattering during pulsations of poppet unit 50.

In similar fashion, during pulsations of poppet unit 50, O-ring 102 facilitates the continued closure of restrictor opening 86 and provides engaging surfaces which do not produce any noticeable chattering.

Referring to FIG. 4, during the initial flow of hot water through pressure balancer 38, passages 110 and 112 of poppet 52 and the open space between the end face of the poppet and tile end wall of well 88, will fill with hot water. As the hot water continues to flow through pressure balancer 38, the pressure of the hot water is effectively sensed by the end face of poppet 52 due to the water path which induces passages 110 and 112 and the open space between the end face of the poppet and the end wall of well 88. In similar fashion, passages 114 and 116 of poppet 54, and the open space between the poppet and the end wall of well 90, will fill with cold water and the pressure of the cold water will be sensed by the end face of the poppet. The sensing of the hot water pressure and the cold water pressure by poppets 52 and 54, respectively, in this manner effectively adds to the pressure-sensing surface provided by diaphragm 56 and enhances the performance of pressure balancer 38.

If the cold water fails, diaphragm 56 must move responsively and continuously to the right from the neutral position illustrated in FIG. 4 until restrictor opening 84 is closed by O-ring 100. During this period, the open space formed by restrictor opening 84 should be decreasing progressively such that the pressure of the water at the surface of diaphragm 56 is continuously changing thereby causing and allowing the diaphragm to continue to deflect and to continue the closure movement of poppet unit 50. Initially, the continued movement of beveled transition surface 115 into restrictive opening 84 provides the progressive closing of the opening necessary to achieve the continuous pressure change at the surface of diaphragm 56.

Due to the geometry of restrictor opening 84 and beveled surface 115, as intermediate portions of the beveled surface located between the radially inboard end and the radially outboard end of the beveled surface approach the restrictor opening, there is no further increasing closure of the opening. Since there is no increasing closure of restrictor opening 84, diaphragm 56 would not sense any changing pressure at the surface of the diaphragm and the diaphragm would cease to deflect.

By placement of O-ring 100 at a position adjacent the radially outboard end of the beveled transition surface 115 as illustrated in FIGS. 1, 4, 5 and 6, the O-ring provides continued and increasing closure of the restrictor opening as the intermediate portions of the beveled surface approaches and moves into the restrictor opening. In this manner, the pressure at the surface of diaphragm 56 will continue to change and the diaphragm and poppet unit 50 will to move to effectively close restrictor opening 84.

Thus, O-ring 100 functions as a continuing closure element to provide continued and increasing closure of restrictor opening 84 in conjunction with the movement of beveled surface 115 into the opening. Further, O-ring 100 functions as a full closure element in closing restrictor opening 84 and also functions as an anti-chattering element of pressure balancer 38.

In similar fashion, O-ring 102 functions as a continuing closure element to provide continued and increasing closure of restrictive opening 86 in conjunction with the movement of beveled surface 117 into the opening. Further, O-ring 102 functions as a full closure element in closing restrictor opening 86 and also functions as an anti-chattering element of pressure balancer 38.

As illustrated in the drawings and described herein above, it will be understood that the one-piece poppet unit 46 of the present invention by having the diaphragm 56 bonded to the disc 106 eliminates the possibility of cross flow between the hot and cold water will provide a zero leak connection therebetween. Thus greater accuracy is provided then was possible in the prior art derives as the pressure balancer 38 of the present invention will adjust for the temperature of the flow exactly to that which was set be the operator via the control knob 174.

In general, the above-identified embodiments are not to be construed as limiting the breadth of the present invention. Modifications, and other alternative constructions, will be apparent which are within the scope of the invention as defined in the appended claims.

What is claimed is:

1. A valve assembly having a pressure balancer which comprises:

a. a housing formed with a chamber;

b. a one-piece poppet unit mounted for movement within the chamber;

c. the poppet unit having a shaft with a circular disc extending radially upwardly from a central portion thereof and a pair of poppets formed on either side of the disc;

d. a diaphragm bonded to the disc of the poppet unit and connected in the chamber to form a compartment on either side thereof in which no leakage occurs between the diaphragm and the disc, and with one of the poppets disposed in each of the compartments to be shifted to a balanced position responsive to the pressure in each of the compartments of the chamber;

e. the circular disc having a first section extending radially upwardly from the shaft a short distance and a second section extending radially upwardly from the first section a short distance;

f. the first section of the disc of greater width than the second section; and g. the diaphragm molded to the second section of the disc on either side thereof to substantially cover the second section, and at the bonded connection therebetween to have a width substantially equal to that of the first section so that its outer surface lies in substantially the same plane as the outer surfaces of the first section.

2. The combination claimed in claim 1 which further comprises:

a. the second section extends radially upwardly from the first section of the disc;

b. the portion of the diaphragm molded about the second section defined a "U" shaped section, the outer surfaces of which lie in substantially the same planes as the outer surfaces of the first section.

3. The combination claimed in claim 42 which further comprises:

a. the poppet unit is a solid member having a circular poppet of equal diameter formed at each end of the shaft with the shaft of reduced diameter;

b. the circular disc extends from the central portion of the shaft between the poppets and of larger diameter than the diameter of the poppets;

c. the first section of the circular disc having a predetermined width and the second section of thinner width extending radially upward a short distance from the central portion of the first section to form a ledge on either side thereof;

d. the diaphragm molded about the second section to define a "U" shaped portion that extends from the ledge of the first section to cover the second section and extend thereabove to be mounted in the chamber to form compartments on either side thereof.

* * * * *